(12) United States Patent
Raffy

(10) Patent No.: US 9,688,581 B2
(45) Date of Patent: Jun. 27, 2017

(54) MOLTEN GRAINS OF TITANIUM SUB-OXIDES AND CERAMIC PRODUCTS COMPRISING SUCH GRAINS

(71) Applicant: SAINT-GOBAIN CENTRE DE RECHERCHES ET D'ETUDES EUROPEEN, Courbevoie (FR)

(72) Inventor: Stéphane Raffy, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 14/432,032

(22) PCT Filed: Sep. 27, 2013

(86) PCT No.: PCT/FR2013/052293
§ 371 (c)(1),
(2) Date: Mar. 27, 2015

(87) PCT Pub. No.: WO2014/049288
PCT Pub. Date: Apr. 3, 2014

(65) Prior Publication Data
US 2015/0251956 A1   Sep. 10, 2015

(30) Foreign Application Priority Data
Sep. 28, 2012   (FR) ..................... 12 59183

(51) Int. Cl.
| | | |
|---|---|---|
| *H01B 1/08* | (2006.01) | |
| *C04B 35/46* | (2006.01) | |
| *C01G 23/04* | (2006.01) | |
| *C04B 35/626* | (2006.01) | |
| *C04B 35/653* | (2006.01) | |

(52) U.S. Cl.
CPC ............. *C04B 35/46* (2013.01); *C01G 23/04* (2013.01); *C01G 23/043* (2013.01); *C04B 35/6265* (2013.01); *C04B 35/653* (2013.01); *C01P 2006/40* (2013.01); *C04B 2235/3232* (2013.01); *C04B 2235/3237* (2013.01); *C04B 2235/424* (2013.01); *C04B 2235/5436* (2013.01); *C04B 2235/5463* (2013.01); *C04B 2235/79* (2013.01); *C04B 2235/80* (2013.01)

(58) Field of Classification Search
CPC ........... H01B 1/02; H01B 1/08; H01M 4/664; H01M 4/624; H01M 4/48; C01B 21/076; C04B 35/46; C01G 23/04

USPC ..... 252/500–519.1, 518.1, 519.2; 429/231.5; 423/610; 501/134
See application file for complete search history.

(56) References Cited

U.S. PATENT DOCUMENTS

| | | | |
|---|---|---|---|
| 4,422,917 A | 12/1983 | Hayfield | |
| 5,173,215 A * | 12/1992 | Clarke | C04B 35/46 423/608 |
| 5,733,489 A * | 3/1998 | Hill | C01G 23/043 264/109 |
| 6,171,460 B1 * | 1/2001 | Bill | H01M 4/664 204/291 |
| 2003/0036001 A1 * | 2/2003 | James | H01G 4/08 429/232 |
| 2004/0072074 A1 * | 4/2004 | Partington | H01M 4/0433 429/231.5 |
| 2006/0005745 A1 * | 1/2006 | Van Osten et al. | 106/436 |
| 2010/0011992 A1 * | 1/2010 | Bujard et al. | 106/439 |
| 2012/0171569 A1 * | 7/2012 | Jones | C04B 35/62635 429/213 |

FOREIGN PATENT DOCUMENTS

| | | |
|---|---|---|
| EP | 0 047 595 A1 | 3/1982 |
| EP | 0 478 152 A1 | 4/1992 |
| GB | 232680 A | 4/1925 |
| WO | WO 92/14683 | 9/1992 |
| WO | WO 2009/024776 A1 | 2/2009 |

OTHER PUBLICATIONS

Gusev ("Ceramic Electrodes Based on Magneli Phases of Titanium Oxides." Science of Sintering, 39, pp. 51-57, 2007).*
Mercier ("Growth and characterization of titanium suboxide crystals." Journal of Crystal Growth, 42, pp. 583-587, Dec. 1977).*
Wang ("One-step synthesis and optical properties of blue titanium suboxide nanoparticles." J Crystal Growth, 252(3-4), pp. 402-406, Sep. 2005).*
International Search Report as issued in International Patent Application No. PCT/FR2013/052293, dated Nov. 28, 2013.
Written Opinion of the International Searching Authority as issued in International Patent Application No. PCT/FR2013/052293, dated Nov. 28, 2013.

* cited by examiner

*Primary Examiner* — Tri V Nguyen
(74) *Attorney, Agent, or Firm* — Pillsbury Winthrop Shaw Pittman LLP

(57) ABSTRACT

Molten grains include titanium suboxides of the formulation $Ti_nO_{2n-1}$, in which the phases are principally $Ti_5O_9$ or $Ti_6O_{11}$ or a mixture of these two phases, the phases $Ti_5O_9$ and/or $Ti_6O_{11}$ representing, in total, more than 60% of the weight of the grains, the grains further including less than 30% by weight of $Ti_4O_7$.

15 Claims, No Drawings

MOLTEN GRAINS OF TITANIUM SUB-OXIDES AND CERAMIC PRODUCTS COMPRISING SUCH GRAINS

CROSS-REFERENCE TO RELATED APPLICATIONS

This application is the U.S. National Stage of PCT/FR2013/052293, filed Sep. 27, 2013, which in turn claims priority to French Application No. 1259183, filed Sep. 28, 2012. The contents of all of these applications are incorporated herein by reference in their entirety.

The invention relates to grains for ceramic applications, consisting predominantly of titanium suboxides. The term "titanium suboxides" is conventionally intended to mean titanium oxides of the general formulation $TiO_x$ in which x is between 1 and 2, limits excluded, in particular the phases termed Magneli phases. The invention relates in particular to a process for producing such grains, and also to ceramic materials and/or products made from said grains or comprising them, in particular but not solely to electrodes or other electrochemical devices, which are in particular of use for producing batteries.

In the remainder of the description, the application of the grains according to the invention and the advantages thereof in the specific field of electrodes are more particularly described. It is, however, clearly understood that such grains, by virtue of the advantages that they provide, are capable of being advantageously used in many other applications in the ceramics field, in particular any field for which good electrical conductivity and/or good resistance to corrosion are desired. The following fields may in particular be mentioned, but without being restricted thereto: catalysis, pigments, photocatalysts, electrical or electronic components.

Patent EP 047 595 B1 (or its equivalent U.S. Pat. No. 4,422,917) provides materials consisting of suboxide of $TiO_x$ type with x between 1.55 and 1.95, for the production of electrodes. The materials are synthesized from $TiO_2$ powder as a mixture with a reducing compound of the Ti, TiN, TiSi, C, TiO or $Ti_2O_3$ type, at temperatures between 1150 and 1450° C. depending on the nature of the reducing compound.

Patent EP 572 559 B1 describes, for this same application, the use of titanium suboxides consisting entirely of Magneli phases corresponding to the composition $Ti_nO_{2n-1}$, with n greater than 4. The patent describes a process for obtaining such materials including a first step substantially identical to that described in EP 047 595 B1, followed by an additional step of annealing at a temperature between 1100 and 1300° C. in the presence of hydrogen, in order to remove all the lower titanium oxides.

International patent application WO 2009/024776 describes similar materials, consisting essentially of a mixture of the "Magneli" crystalline phases $Ti_4O_7$, $Ti_5O_9$ and $Ti_6O_{11}$. It is indicated that such a make-up allows a better compromise between the electrical conductivity of the titanium suboxide particles and their resistance to corrosion, the $Ti_4O_7$ phase being described as the most advantageous for obtaining the strongest conductivities. The method for obtaining such particles is described as identical to that described in U.S. Pat. No. 4,422,917 and consists in reducing a $TiO_2$ powder with hydrogen for 8 hours and at a temperature of 1180° C.

Patent application EP 478 152 A1 underlines, however, the drawbacks associated with the methods for preparing grains of titanium suboxide(s) $TiO_x$ described in the previous publications. In order to solve them and in particular to achieve values of x close to 1.80, the document indicates that the $TiO_2$ reduction must be carried out on a support consisting of a porous layer of graphite. The amount of titanium suboxide powder which can be obtained by means of such a process appears, however, to be necessarily limited by the small thickness of the layer present above the support. In addition, such a process requires an initial $TiO_2$ powder which is very fine (or which has a large specific surface area), thereby limiting its economic value.

The previous analysis shows that there is still at the current time a need for a simple, economical and reliable method for preparing such grains of titanium suboxides corresponding to a general formulation $TiO_x$, in particular in which x is between 1.50 and 1.95, quite particularly in which x is between 1.75 and 1.85, and very preferably between 1.76 and 1.83.

Likewise, there is a constant need to provide grains and powders of titanium suboxide(s) having the best compromise between the electrical conductivity and resistance to corrosion.

The subject of the present invention aims to effectively solve such problems.

According to a first aspect, the present invention thus relates to a process for producing grains consisting essentially of titanium suboxide(s), said process comprising the following steps:

a) melting, under reducing conditions, an initial mixture (or initial feedstock) comprising titanium dioxide particles, at a temperature greater than 1500° C., preferably at a temperature greater than 1600° C., or even greater than 1700° C., b) cooling the molten mixture until it has solidified, c) grinding the solidified mass in order to obtain molten grains of the titanium suboxide(s).

According to preferred embodiments of the process:

The initial mixture comprises titanium oxide and coke, used as reducing agent.

The initial mixture comprises between 1% and 25% by weight of coke, relative to the total weight of the mixture, preferably between 10% and 18% by weight of coke.

Coke is used in the initial mixture and the melting is carried out under air.

The titanium dioxide represents more than 90% of the total inorganic mass present in the initial mixture and preferably represents all of the inorganic mass present in the initial mixture.

Without departing from the context of the invention, the initial mixture may, however, also comprise inorganic matter other than the titanium dioxide, for example in an amount less than 10%, even less than 4%, or even less than 3%, even less than 1%, even less than 0.5% of the total inorganic mass. This inorganic matter may, for example, be silica ($SiO_2$), pentavalent oxides such as $Nb_2O_5$ or $Ta_2O_5$, $ZrO_2$, Ba Sr oxides or else impurities (associated in particular with the raw materials used) such as $Al_2O_3$, $Cr_2O_3$ or $Fe_2O_3$ or oxides of alkali metals or of alkaline-earth metals of the Ca, Na, K or Li type.

During step a), an electric arc furnace is preferably used, but all known furnaces can be envisioned, such as an induction furnace or a plasma furnace, provided that they make it possible to completely melt the mixture or the initial feedstock.

Preferably, in step b), the cooling is carried out in such a way that the molten liquid is slowly solidified, in particular in such a way that the molten liquid is entirely solidified under the course of more than 5 minutes, for example by casting the molten liquid in the form of ingots.

In step c), the solidified mass is ground, according to conventional techniques, until the grain size suitable for the envisioned application is obtained. For example, the grinding can be continued until grains of millimetric size, for example of the order of 0.1 to 5 millimeters, or even micrometric size, for example of the order of 0.1 to 50 microns, are obtained.

Through the application of such a process, it has appeared to be possible to synthesize, directly and without excessive difficulties, molten grains (i.e. grains resulting from a melting-recrystallization process) consisting essentially of titanium suboxides and corresponding to the general average formulation $TiO_x$, it being possible for the value of x to be very easily adjusted according to the composition of the initial mixture up to values close to 1.5, in particular to values between 1.75 and 1.85 and in particular between 1.76 and 1.83. Advantageously, such a modulation can be obtained directly according to the invention as a function of the percentage amount of coke initially present in the mixture.

Better still, experiments carried out by the applicant company have shown that the melting-recrystallization process can be carried out under air in a suitable device (such as an electric arc furnace) without a reducing atmosphere being set up in the heating device, as taught in the prior art. It in fact appears that the reaction for reduction of the $TiO_2$ by the reducing carbon gives off a small amount of CO, this small amount of CO being, however, sufficient, against all expectations, to ensure a reducing atmosphere above the molten matter and the titanium oxide reduction process. The grains of the invention may in particular and advantageously be produced by electrical melting processes, allowing the production of large amounts of grains with advantageous yields and a very good cost/performance ratio.

In addition, the molten grains resulting from the implementation of such a process have shown a composition different than the grains obtained by different techniques, in particular with regard to the relative proportions of the Magneli phases present, as in particular described in the publications WO2009/024776 or EP 572 559 B1.

Quite particularly and entirely unexpectedly, the experiments carried out by the applicant company have demonstrated that these compositions, never yet described in the field, result in properties of electrical conduction and resistance to corrosion that are, overall, greater than those of the titanium suboxides previously described. In particular, while the electrical conduction properties have appeared to be substantially equivalent, the materials obtained from the grains according to the invention have shown substantially improved resistances to corrosion. According to the research carried out by the applicant company, the electrical conductivities of such compositions can be further increased by controlling the amount of the other oxides present in the molten grains obtained by means of the process according to the invention.

These experiments are reported in the remainder of the present description, in the experimental section.

Such properties make the use of such materials very advantageous in numerous ceramics application fields and in particular for the production of electrodes or other electrochemical devices, in particular of use for the production of batteries.

The present invention thus also relates to the molten grains, in particular in powder form, which can be obtained by means of a process as previously described.

The molten grains according to the invention consist essentially of titanium suboxides corresponding to the formulation $Ti_nO_{2n-1}$, in which said phases are principally $Ti_5O_9$ or $Ti_6O_{11}$ or a mixture of these two phases, said $Ti_5O_9$ and/or $Ti_6O_{11}$ phases representing, in total, more than 60% of the weight of the grains, said grains also comprising less than 30% by weight of $Ti_4O_7$.

The molten grains according to the invention preferably comprise more than 80% by weight, even more than 85% by weight or even more than 90% by weight, in total, of titanium suboxide(s) corresponding to the generic formulation $Ti_nO_{2n-1}$, n being an integer greater than 3.

Preferably, the $Ti_3O_5$ phase represents less than 20% of the total weight of the grains and preferably less than 15%, even less than 10%, even less than 5% of the total weight of the grains.

The molten grains preferably comprise in total more than 92%, even more than 94%, or else more than 95% of titanium suboxide(s).

Without departing from the context of the present invention, the grains may, however, comprise other phases, in particular silica ($SiO_2$), or else other elements, essentially present in oxide form or in solid solution with the titanium suboxide(s), in particular Al, Cr, Zr, Nb, Ta, Li, Fe, or alkali metals or alkaline-earth metals of the Ca, Sr, Na, K or Ba type. On the basis of the corresponding simple oxides, the total summed amount of said elements present is preferably less than 10% by weight of the total mass of the grains, for example less than 5%, even less than 4%, or even less than 3% by weight of the total mass of the grains. The presence of these elements may in particular be desired, in particular Nb and Ta, and quite particularly Nb, or may be simply linked to the impurities present in the raw materials used.

According to one advantageous mode, the amount of silicon (expressed in $SiO_2$ form) in the grains according to the invention is less than 1.5% by weight, even less than 1% by weight.

According to one advantageous mode of the invention, the cumulative amount of silicon (expressed in $SiO_2$ form) and of zirconium (expressed in $ZrO_2$ form) in the grains according to the invention is less than 2.5% by weight and is preferably less than 2% by weight, even less than 1.5% by weight.

The grains may also comprise traces of nitrides (titanium nitrides, oxynitrides or carbonitrides).

According to one preferred mode, the molten grains according to the invention consist solely of said titanium suboxides, the other phases being present only in the form of unavoidable impurities.

In particular, said titanium suboxides are preferably principally $Ti_nO_{2n-1}$ phases in which n is between 4 and 9, limits included, i.e. $Ti_4O_7$, $Ti_5O_9$, $Ti_6O_{11}$, $Ti_7O_{13}$, $Ti_8O_{15}$ or $Ti_9O_{17}$, said phases representing, in total, more than 80%, even 85% or even 90% of the weight of the grains.

The term "principally" is intended to mean that the principal diffraction peaks observed on an X-ray diffractogram correspond to these Magneli phases.

In particular, for the purposes of the present invention, a phase is considered to be "principal" if it represents more than 25% of the weight of the grains and preferably at least 35% of the weight of the grains.

According to one particularly preferred mode, said principal phases are $Ti_nO_{2n-1}$ phases of generic formulation $Ti_5O_9$ or $Ti_6O_{11}$ or a mixture of these two phases.

In particular, in the molten grains according to one advantageous mode of the present invention, the $Ti_5O_9$ and/or $Ti_6O_{11}$ phases represent, in total, more than 60% of the weight of the grains, preferably more than 70% of the weight of the grains, and very preferably more than 80% of the weight of the grains.

Surprisingly, although their electrical resistivity remains comparatively low, it has been possible to note that the molten grains according to the invention usually, even systematically, comprise a relatively low amount of the Magneli phase with n=4 ($Ti_4O_7$), reported however in the literature as providing the weakest electrical resistivities. In particular, the grains according to the invention may comprise less than 30% by weight of $Ti_4O_7$. In particular, the grains according to the invention generally comprise less than 25% by weight of $Ti_4O_7$, and usually less than 20% by weight of $Ti_4O_7$ or even, in certain compositions, less than 15% by weight of $Ti_4O_7$.

The grains according to the invention may, for example, comprise, in the form of a minor phase or more commonly in the form of traces, a phase other than those termed Magneli phases, in particular $Ti_3O_5$ or $Ti_2O_3$ or else $TiO_2$.

Surprisingly, the electrical resistivities measured for the materials obtained from the grains according to the invention are comparable to those given in the literature for the products obtained according to the prior processes. In particular, the molten grains according to the invention comprising less than 30% by weight, in total, of $Ti_nO_{2-n1}$ titanium suboxide phases other than $Ti_5O_9$ and/or $Ti_6O_{11}$ have shown particularly advantageous properties, as will be reported in the remainder of the description.

The molten grains as previously described correspond essentially to an average overall formulation $TiO_x$, in which x is between 1.95 and 1.50, and preferably in which x is between 1.75 and 1.85. The term "essentially" is intended to mean that other elements or oxides as previously described may, in a minimal amount, be part of the composition of the grains, without however being taken into account in the above formulation.

For the purposes of the present invention, the weight percentages of the various phases constituting the grains can be determined according to techniques well known in the field, in particular by X-ray diffraction optionally combined with X-ray fluorescence analysis, as will be described in the remainder of the description.

In order not to needlessly weigh down the present description, not all the possible combinations according to the invention between the various preferred modes of the compositions of the grains according to the invention, such as have just been previously described, are reported. It is, however, clearly understood that all the possible combinations of the initial and/or preferred values and fields previously described are envisioned at the time of filing of the present application and should be considered as described by the applicant in the context of the present description (in particular two, three or more combinations).

A subject of the invention is also a ceramic product or material obtained by sintering of the grains previously described. The sintering can in particular be carried out at a temperature of between 1200° C. and 1800° C.

According to another aspect, a subject of the invention is a product coated with a coating obtained by projection of a powder consisting of the grains previously described.

Generally, all the embodiments previously described in relation to the compositions of the molten grains are directly transposable to the ceramic products (or material) or coatings previously described. Quite particularly, all the values and all the preferred fields previously described in relation to the composition of the corresponding grains, in particular all the values and fields which concern the various phases and elements capable of being part of their composition, are directly transposable to the composition of the product (or of the material) according to the invention.

According to one particular application of the present invention, the product according to the invention may be a ceramic part used as an electrode.

A process for producing a product from an initial mixture of grains according to the invention is, for example, the following:

Firstly, molten grains according to the invention as previously described are mixed together. For example, the molten grains have been ground in such a way that they have a median diameter suitable for the application. The production process typically comprises a step of blending an initial mixture comprising the grains and optional organic binder(s) and then a step of forming for example by extrusion or pressing, or tape casting, etc. The process then comprises a firing and/or sintering step, carried out for example at a temperature greater than 1200° or even greater than 1300° C., but not exceeding 1800° C., preferably not exceeding 1750° C., preferably under a neutral atmosphere.

The invention and its advantages will be understood more clearly on reading the nonlimiting examples which follow. In the examples, all the percentages are given by weight.

EXAMPLES

In all the examples according to the invention, the samples were prepared from a mixture of raw materials consisting of a coke powder and a commercial titanium oxide powder in rutile form comprising more than 96% of $TiO_2$.

The samples of examples 1 to 6 according to the invention are obtained by melting the mixture of the above powders, in the various proportions reported in table 1.

More specifically, the mixtures of initial reagents are pre-melted in an electric arc furnace, under air. The molten mixture was then cast into ingots allowing relatively slow cooling.

On each sample, a specimen is taken from the molten mixture after cooling in order to measure the electrical resistivity thereof (denoted Re and conventionally given in Ohm·cm) according to various protocols described below in the experimental section.

The rest of the product obtained is ground and sieved so as to retain the powder at 20 μm. The powder finally obtained after sieving has a median diameter $d_{50}$ of 8.5 μm.

A first comparative sample A, not in accordance with the invention, is also synthesized from a mixture of $TiO_2$ powder (rutile previously described) and of carbon black sold by Cabot Corporation, in a proportion equal to 4% of the total weight of the mixture of $TiO_2$ and carbon black. The mixture is pelleted and sintered at 1450° C. under argon for 2 hours, without going as far as melting said mixture, in accordance with the process described in the prior publications U.S. Pat. No. 4,422,917 and WO 2009/024776. The product thus sintered is then ground until a powder with a median diameter $d_{50}$ equal to 8.8 μm ($d_{10}$=1.6 μm; $d_{50}$=8.8 μm; $d_{90}$=26.2 μm) is obtained.

A second comparative sample B, not in accordance with the invention, is also synthesized from a mixture of $TiO_2$ powder (anatase) and carbon black sold by Cabot Corporation, in a proportion equal to 1% of the total weight of the mixture of $TiO_2$ and carbon black. The mixture is sintered at 1450° C. under argon, without going as far as melting said mixture, for 2 hours, and then ground as previously.

The chemical composition and the crystalline phases present are analyzed using the powder of molten grains for some of the samples thus obtained. The results are reported in table 1 which follows.

The resistance to corrosion of the molten grains constituting the powders is then measured for certain samples. The results are grouped together in table 2 below.

The experimental protocols used for the characterization of the composition and the properties of the various samples obtained are the following:

1°) The overall chemical composition of the grains in the $TiO_x$ form was determined by means of a test consisting of measuring the gain in mass of a sample brought to 1000° C. under air which will oxidize until the $TiO_2$ stoichiometry is achieved. The heating is continued until the weight of the sample is stabilized. The final gain in weight, corresponding to the difference between the stoichiometric compound $TiO_2$ and the initial composition, makes it possible to calculate the value of x of the general formula $TiO_x$ reported in table 1.

The content of impurities is determined by X-ray fluorescence. It is thus determined that all the samples tested have a total amount of impurities of between 1% and at most 4% by weight.

2°) The crystalline phases present in the refractory products were characterized by X-ray diffraction. The results obtained are grouped together in table 1 which follows. In this table, PP indicates a principal phase, MP indicates the presence of at least one other minor phase, and "~" signifies that the phase(s) is (are) present in trace form. For the purposes of the present invention, it is considered that a phase is a "principal" phase when it represents at least 25% of the total weight of the grains. It is considered that a phase is a "minor" phase when it represents more than 5% and less than 25% of the weight of the grains, in particular more than 5% and less than 20% of the weight of the grains and preferably more than 5% and less than 15% of the weight of the grains, it being understood that the summed amount of the weight of the minor phases is normally less than 50% and preferably less than 30%, even less than 20%, of the weight of the grains. It is considered that a phase is in "trace" form when it represents less than 1% of the total weight of the grains.

The proportions of the various phases constituting the grains were measured quantitatively from the diffractograms of the powders by means of the Rietveld method, using the EVA® software and the PDF-2 Release 2005 ICDD database. More particularly, the quantitative analysis of the phases is carried out conventionally by refining of the diffractograms according to the "Full Pattern Matching" option proposed by the EVA software and developed in the DIFFRACplus Evaluation Package Release (2005) program series. The relative proportions by weight of the major and minor phases of the $Ti_3O_5$ (file 01-082-1138 of the database), $Ti_4O_7$ (file 01-077-1392), $Ti_5O_9$ (file 01-076-1690) and $Ti_6O_{11}$ (file 01-076-1266) type are measured for examples 3 to 5. The total sum of the contributions of these phases in each sample is approximated to 100%, the other phases normally being only present in trace form in these examples.

3°) The electrical resistivities (Re) of the samples according to the invention and of comparative examples A and B are measured according to the Van Der Pauw method according to various protocols:

A resistivity Re-1 is measured on disks 25 mm in diameter and 2 mm thick by taking a cylindrical core sample, 25 mm in diameter, of the molten mixture (i.e. after melting step b) according to the invention and without grinding) from which a pellet 2 mm thick of the crude material obtained by melting is cut.

A resistivity Re-2 is measured for the sample according to example 4 on disks 25 mm in diameter and 2 mm thick, of a material obtained by grinding the molten mixture after cooling until a powder with a median diameter of approximately 8.5 micrometers is obtained, then sintering, at 1200° C., said grains in a graphite matrix, under a pressure of 21 MPa (3000 psi) and under vacuum, for one hour.

A resistivity Re-3 is measured for the sample according to example 4 on disks 25 mm in diameter and 2 mm thick, of a material obtained according to the same principle as previously described for the measurement of Re-2, but at a sintering temperature equal to 1400° C.

Since it is sought to maximize the electrical conductivity, the samples will be judged as being all the better the lower their electrical resistivity (Re).

4°) The resistance to corrosion of the materials was evaluated by immersing 1 g of powder in 15 ml of 85% concentrated $H_3PO_4$ or HCl or $H_2SO_4$ solution (as indicated in table 2) at a temperature of 60° C. After a period of time as indicated in table 2, 1 ml of the solution is sampled and the content of Ti element dissolved in the solution is quantitatively determined by ICP. The various contents measured, given in mg per ml, are reported in table 2. Since, according to the invention, the strongest resistances to corrosion are sought, the samples are all the better the lower the quantity of the Ti element.

TABLE 1

| Example | | 1 | 2 | 3 | 4 | 5 | 6 |
|---|---|---|---|---|---|---|---|
| Coke (% in the raw materials) | | 1.0 | 10.1 | 13.8 | 15.3 | 10.4 | 16.7 |
| x in $TiO_x$ | | 1.88 | 1.86 | 1.82 | 1.79 | 1.74 | 1.68 |
| Phases | PP | $Ti_9O_{17}$ $Ti_8O_{15}$ $Ti_7O_{13}$ | $Ti_8O_{15}$ $Ti_7O_{13}$ | $Ti_5O_9$ (68) $Ti_6O_{11}$ (32) | $Ti_5O_9$ (56) | $Ti_3O_5$ (40) $Ti_4O_7$ (35) | $Ti_3O_5$ |
| | MP | | $Ti_6O_{11}$ | | $Ti_6O_{11}$ (18) $Ti_3O_5$ (15) $Ti_4O_7$ (11) | $Ti_5O_9$ (24) | $Ti_4O_7$ |
| | ~ | | $Ti_9O_{17}$ | $Ti_4O_7$ $TiO_2$ | | | |
| Re-1 (Ω · cm) | | | | $11 \cdot 10^{-3}$ | $9 \cdot 10^{-3}$ | $4 \cdot 10^{-3}$ | |
| Re-2 (Ω · cm) | | | | | $3 \cdot 10^{-3}$ | | |
| Re-3 (Ω · cm) | | | | | $4 \cdot 10^{-3}$ | | |

In table 1 above, the respective weight percentages of the principal phases and, where appropriate, the minor phases in the grains, as measured from the X-ray diffractogram and Rietveld analysis of the powders according to examples 3, 4 and 5, have been reported between parentheses.

The analysis of the crystalline phases by X-ray diffraction and Rietveld analysis on the powder of the grains of example B show that they consist of the $Ti_4O_7$ (25% of the total weight of the grains), $Ti_5O_9$ (30% by weight), $Ti_6O_{11}$ (20% by weight) and $Ti_3O_5$ (25% by weight) phases. The general formula of the grains, obtained by measuring the gain in mass previously described, is $TiO_{1.79}$ for comparative sample B, as it is for example 4. However, it can be seen, by comparison with the data reported in table 1, that the grains obtained according to example 4 according to the invention and those obtained according to comparative example B have very different relative percentages of the Magneli phases, although their general formulation $TiO_{1.79}$ is identical.

A general formula $TiO_{1.82}$ is also determined for sample A, by measuring the gain in mass previously described. This formulation appears this time to be identical to that of example 3 according to the invention. A comparable electrical resistivity is also measured between sample A and the sample according to example 3 according to the invention.

The results with respect to the tests for resistance to corrosion of these two samples according to the protocol previously set out are reported in table 2 below.

TABLE 2

| Ti having passed into solution (mg/l) | Example 3 | Example A |
|---|---|---|
| $H_3PO_4$/72 hours | 4.5 | 6.2 |
| $H_3PO_4$/144 hours | 10.0 | 15.0 |
| $H_3PO_4$/216 hours | 13.0 | 49.0 |
| HCl/72 hours | 31.0 | 59.0 |
| HCl/144 hours | 38.0 | 62.0 |
| $H_2SO_4$/72 hours | 4.3 | 25.0 |
| $H_2SO_4$/144 hours | 6.2 | 39.0 |

The analysis of the data reported in table 2 shows the superiority of the products/materials obtained from the grains according to the invention: for a similar composition (but a very different Magneli phase distribution), it is observed that the material according to the invention exhibits a much better resistance to corrosion.

The improved results obtained for the molten grains with respect to corrosion in the presence of $H_3PO_4$ make it possible to envision the use of a material obtained according to the invention as an electrode in electrolysis reactions for which the electrolyte is $H_3PO_4$, for example the electrolysis of Co(II) so as to obtain Co(III) or in the purification of $H_3PO_4$ by electrolysis in $H_3PO_4$.

The improved results obtained for the molten grains with respect to corrosion in the presence of HCl make it possible to envision the use of a material obtained according to the invention as an electrode for the production of chlorine, from concentrated hydrochloric acid.

The improved results obtained for the molten grains with respect to corrosion in the presence of $H_2SO_4$ make it possible to envision the use of a material obtained according to the invention in lead batteries for which the electrolyte is $H_2SO_4$.

According to an example 7 according to the invention, a sample is prepared from a mixture of raw materials consisting of a coke powder and a powder of titanium oxide in anatase form and comprising more than 98% of $TiO_2$. The coke powder represents 10.4% by weight of the initial mixture of raw materials.

The sample according to example 7 is obtained, as for the previous examples 1 to 6, by melting the mixture according to the same techniques (melting using an electric arc furnace, under air, then casting into ingots and then grinding).

A general formula $TiO_{1.79}$ is determined for the sample according to this new example, by measuring the gain in mass previously described. This formula is identical to that of the sample according to example 4. The weight percentages of the principal and minor phases in the grains also appear to be comparable to those previously described in table 1 for example 4. As for example 4, the weight of the $Ti_4O_7$ phase in the sample according to example 7 appears in particular to be much lower than 30% of the total weight of the grains.

The sample according to example 7 is formed so as to measure the previously described electrical resistivity Re-3 thereof. The measurement shows a resistivity equal to $5 \times 10^{-4}$ Ω·cm, which is much lower than that of the sample according to example 4.

The chemical analysis of the impurities of the molten grains according to examples 4 and 7 is reported in table 3 which follows.

TABLE 3

| | $TiO_x$ | $SiO_2$ | $Al_2O_3$ | $Fe_2O_3$ | $Nb_2O_5$ | $ZrO_2$ | $Cr_2O_3$ |
|---|---|---|---|---|---|---|---|
| Example 4 (% by weight) | remainder | 1.25 | 0.35 | 0.8 | 0.4 | 0.7 | 0.2 |
| Example 7 (% by weight) | remainder | 0.8 | 0.2 | 0.2 | 0.2 | 0.3 | <0.1 |

The table illustrates the unexpected influence of the impurities present in the molten grains according to the invention and in particular of silicon or of zirconium, the previously reported electrical resistivity measured according to example 7 (in which the amount of impurities is lower) being much lower than that measured on the sample according to example 4.

In the preceding examples and description, the invention was especially described in relation to the advantages that it provides with respect to use in the electrode field.

However, it is quite obvious that the invention also relates to the use of the grains of the invention in other applications, in particular all those where good electrical conductivity and also good resistance to corrosion are necessary. According to the application, the size of the molten grains according to the invention may especially be adjusted, in particular by choosing a suitable grinding method.

According to one possible mode, it is also possible to use the molten grains according to the invention as a filler in polymers, in particular in a process for producing batteries.

The invention claimed is:

1. Molten grains consisting essentially of phases of titanium suboxides corresponding to the formulation $Ti_nO_{2n-1}$, n being a positive integer, in which said phases are principally $Ti_5O_9$ or $Ti_6O_{11}$ or a mixture of these two phases, said $Ti_5O_9$ and/or $Ti_6O_{11}$ phases representing, in total, more than 60% of the weight of the molten grains, said molten grains also comprising less than 30% by weight of $Ti_4O_7$, wherein the molten grains are obtained by:

melting, under reducing conditions, an initial mixture comprising titanium dioxide particles, at a temperature greater than 1700° C., cooling the molten mixture until the mixture has solidified, and grinding the solidified mixture in order to obtain molten grains of the titanium suboxides.

2. The molten grains as claimed claim 1, wherein the $Ti_5O_9$ and/or $Ti_6O_{11}$ phases represent, in total, more than 70% of the weight of the molten grains.

3. The molten grains as claimed in claim 1, comprising less than 25% by weight of $Ti_4O_7$.

4. The molten grains as claimed in claim 1, comprising more than 90% by weight, in total, of one or more phases of titanium suboxides corresponding to the generic formulation $Ti_nO_{2n-1}$, n being an integer greater than 3.

5. The molten grains as claimed in claim 4, wherein n is between 4 and 9, limits included, and wherein said $Ti_nO_{2n-1}$ phases represent, in total, more than 90% of the weight of the molten grains.

6. The molten grains as claimed in claim 1, essentially corresponding to an average overall formulation $TiO_x$, in which x is between 1.95 and 1.50.

7. The molten grains as claimed in claim 6, wherein x is between 1.75 and 1.85.

8. A ceramic product or material, obtained by sintering the molten grains as claimed in claim 1.

9. The ceramic product or material as claimed in claim 8, wherein the molten grains are sintered at a temperature of between 1200° C. and 1800° C.

10. A product comprising a coating obtained by projection of the molten grains as claimed in claim 1.

11. A process for producing the molten grains consisting essentially of phases of titanium suboxides corresponding to the formulation $Ti_nO_{2n-1}$, n being a positive integer, in which said phases are principally $Ti_5O_9$ or $Ti_6O_{11}$ or a mixture of these two phases, said $Ti_5O_9$ and/or $Ti_6O_{11}$ phases representing, in total, more than 60% of the weight of the molten grains, said molten grains also comprising less than 30% by weight of $Ti_4O_7$, said process comprising:

melting, under reducing conditions, an initial mixture comprising titanium dioxide particles, at a temperature greater than 1700° C., cooling the molten mixture until the mixture has solidified, grinding the solidified mixture in order to obtain molten grains of the titanium suboxides.

12. The production process as claimed in claim 11, wherein the initial mixture comprises a coke reducing agent.

13. The production process as claimed in claim 12, wherein the initial mixture comprises between 1% and 25% by weight of coke, relative to the total weight of the mixture.

14. The production process as claimed in claim 12, wherein the melting is carried out under air.

15. The production process as claimed in claim 11, wherein the titanium dioxide represents more than 90% of the total inorganic mass present in the initial mixture.

* * * * *